United States Patent [19]

Bradley

[11] Patent Number: 5,398,366
[45] Date of Patent: * Mar. 21, 1995

[54] ROCKER TOOTHBRUSH
[76] Inventor: Terry Bradley, Box 1749, Howell, Utah 84316
[*] Notice: The portion of the term of this patent subsequent to Dec. 14, 2010 has been disclaimed.
[21] Appl. No.: 119,476
[22] Filed: Sep. 10, 1993

Related U.S. Application Data

[63] Continuation of Ser. No. 4,460, Jan. 14, 1993, abandoned, which is a continuation of Ser. No. 677,656, Mar. 29, 1991, abandoned.
[51] Int. Cl.⁶ .................................................. A46B 9/04
[52] U.S. Cl. .................................. 15/167.1; 15/176.4; 15/201; 15/202; 16/260; 403/381; D4/105
[58] Field of Search .................... 15/106, 110, 159.1, 15/160, 167.1, 194, 172, 201, 202, 176.1–176.6; D4/104–113, 119, 130, 132, 134, 137; 16/223–225, 227, 260, DIG. 13; 403/331, 381, 291; 132/308; 128/62 A; 433/141, 142

[56] References Cited

U.S. PATENT DOCUMENTS

| | | | |
|---|---|---|---|
| 1,172,109 | 2/1916 | Cammack | 15/176.5 X |
| 1,212,001 | 1/1917 | Baxter | 15/167.1 |
| 1,255,955 | 5/1917 | Hickman | 15/167.1 |
| 1,270,233 | 6/1918 | Stoorman | 15/167.1 |
| 1,620,330 | 3/1927 | Douglass | 15/167.1 |
| 1,968,303 | 7/1934 | McMath | 15/167.1 |
| 2,122,619 | 7/1938 | McMath | 15/167.1 |
| 2,172,624 | 9/1939 | Robert | 15/202 X |
| 2,220,053 | 10/1940 | Pruner | 15/27 |
| 2,246,867 | 6/1941 | Thomas et al. | 15/110 |
| 2,263,802 | 11/1941 | Grusin . | |
| 2,582,552 | 1/1952 | Marco | 15/167.1 |
| 2,583,886 | 1/1952 | Schlegel | 15/23 |
| 2,604,649 | 7/1952 | Stephenson et al. | 15/201 X |
| 2,655,674 | 10/1953 | Grover | 15/23 |
| 2,691,187 | 10/1954 | Lorenz | 16/149 |
| 2,791,454 | 5/1957 | Saives . | |
| 2,882,544 | 4/1959 | Hadidian | 15/194 X |
| 2,935,755 | 5/1960 | Leira et al. | 15/201 X |
| 3,082,457 | 3/1963 | Lucibello et al. | 15/167.1 |
| 3,129,449 | 4/1964 | Cyzer | 15/28 |
| 3,152,349 | 10/1964 | Brennesholtz | 15/167.1 |
| 3,290,949 | 12/1966 | Samet | 403/291 X |
| 3,879,791 | 4/1975 | Isler | 15/167 R |
| 3,978,852 | 9/1976 | Annoni | 128/62 A |
| 4,317,463 | 3/1982 | Massetti | 132/84 R |
| 4,333,199 | 6/1982 | Del Rosario | 15/172 X |
| 4,488,328 | 12/1984 | Hyman . | |
| 4,575,894 | 3/1986 | Stevens et al. | 15/176.5 X |
| 4,633,542 | 1/1987 | Taravel | 15/167.1 |
| 4,691,718 | 9/1987 | Sakuma et al. | 132/84 R |
| 4,694,844 | 9/1987 | Berl et al. | 132/308 X |
| 4,712,267 | 12/1987 | Cheng | 15/172 |
| 5,121,520 | 6/1992 | Brice | 15/167.1 |

FOREIGN PATENT DOCUMENTS

| | | | |
|---|---|---|---|
| 195608 | 2/1908 | Germany | 15/167.1 |
| 1210409 | 2/1966 | Germany | 15/201 |
| 2239584 | 3/1973 | Germany | 403/381 |
| 127188 | 1/1950 | Sweden | 15/167.1 |
| 141640 | 4/1920 | United Kingdom | 15/201 |
| 590708 | 7/1947 | United Kingdom | 15/194 |

Primary Examiner—David A. Scherbel
Assistant Examiner—Charles Cooley
Attorney, Agent, or Firm—Workman, Nydegger & Seeley

[57] ABSTRACT

A toothbrush that affords tilting movement to the bristles thereof only in either of two opposite directions about a tilting axis disposed at an acute angle to the longitudinal axis of the handle of the toothbrush. The bristles project from the top surface of a bristle support, the bottom surface of which is secured to the distal end of the toothbrush handle. In one embodiment, an elongated attachment rod secured to the bottom surface of the bristle support is rotatably received in an elongated attachment rod receiving slot formed in the distal end of the handle in alignment with the tilting axis. In an alternate embodiment, first and second attachment knobs projecting from opposite ends of the bristle support are rotatably received in first and second opposed attachment knob receiving sockets formed in the distal end of the handle at positions in alignment with the tilting axis. Alternatively, the bristle support may be so secured to the distal end of the handle of the toothbrush as to be slidable in either of two opposite directions along a sliding axis disposed at an acute angle to the longitudinal axis of the handle. In this embodiment an elongated attachment rod secured to the bottom surface of the bristle support is slidably received in an elongated attachment rod receiving slot formed in the distal end of the handle in alignment with the sliding axis.

30 Claims, 7 Drawing Sheets

ROCKER TOOTHBRUSH

This application is a continuation application of U.S. patent application Ser. No. 4,460, filed on Jan. 14, 1993, which was a continuation application of U.S. patent application Ser. No 677,656, filed on Mar. 29, 1991, both of which are now abandoned.

BACKGROUND

1. Field Of the Invention

The present invention is in the field of toothbrushes, particularly toothbrushes devised to impart an up-down motion as the brush is stroked side-to-side along a user's teeth.

2. Technology Review

Throughout the years a large variety of toothbrushes have been devised with the objective in mind of providing a brush that does a better job of cleaning teeth. In general, all brushes have in common an elongate member with a handle to be grasped by the user and bristles positioned at one end for brushing against the teeth. Some have employed elongate members with straight handles and some have employed members with angled handles.

Most dentists have usually advised their patients to brush with up-and-down strokes across their teeth rather than side-to-side strokes. However, this practice is awkward and consequently not faithfully followed. At least one important reason for such up-and-down stroking is to cause the bristles to penetrate slightly between the teeth and gum. Most periodontal disease originates as a result of bacteria residing in this region. Brushing in this manner minimizes the start and growth of such disease. Such brushing has been deemed so advisable that some brushes have been devised with electric means, such as vibrators, to effect such a motion. However, these are expensive and have not generally found favor with the public. Consequently, it seemed desirable to have a toothbrush which did not incorporate a vibrator but which would permit a user to brush in a convenient side-to-side fashion while at the same time effecting an up-and-down motion of the bristles so as to penetrate slightly the space between the teeth and gum. However, such a brush has not heretofore been available.

BRIEF SUMMARY AND OBJECTS OF THE INVENTION

The present invention seeks to resolve the problem as noted above and to provide other improvements. Specifically:

It is an object of the present invention to provide a brush which effects an up-and-down motion of the bristles while the brush is stroking the teeth in a side-to-side fashion.

It is a further object of the present invention to provide a brush that effects a slight penetration of the bristles between the teeth and the gums as the brush is stroking the teeth in a side-to-side fashion.

It is a further object of the present invention to provide a brush that effects a brushing of each tooth at all angles as the brush is stroking the teeth in a side-to-side fashion.

It is a further object of the invention to provide a brush that brushes a region wider than the bristles of the brush, thus providing more effective coverage.

It is a further object of the invention to provide a brush that effects a swirling action of the bristles across the teeth as the brush is stroking the teeth in a side-to-side fashion.

It is a further object of the invention to provide a brush that accomplishes the above objectives without the incorporation of an electric device such as a vibrator.

It is a further object of the invention to provide a brush having means for water lubrication and cleaning.

Briefly summarized, the foregoing objects and advantages are realized by the toothbrush of the present invention. One embodiment comprises a brush having an elongate handle with means at the distal end devised to hold the bristles. The bristles are affixed in separate bristle-holding elongate pads with are configured so as to be pivotally attached to cooperating pad-holding mean. Preferably there will be four such bristle-holding pads although there could be more or less. Each pad is o elongate configuration devised so as to secure, preferably, two elongate rows of bristles. The bristles are of conventional design as are found in other toothbrushes.

The pads are so sized and configured as to permit a pair of pads to be preferably positioned in a side-by-side relationship with a relatively small space between, for reasons explained below. A second similar pair of pads is preferably positioned in an end-to-end relationship to the first pair with a relatively small space between. The entire assembly of four pads is so sized and configured as to occupy approximately the same area at the distal end of the toothbrush as do the bristles in conventional toothbrushes.

As noted above, each pad is pivotally attached to the pad-holding distal end of the toothbrush. The pivotal attachment comprises, preferably, an elongate pivot hinge, positioned so as to have the pivotal axis form an acute angle with respect to the elongate axis of the pad. The pivotal axis of a pair of pads are preferably so arranged as to form a substantially "V" configuration. However, as noted above, adjacent pads have a space between them, and therefore the apex at the "V" is open, i.e., the legs of the "V" do not come completely together.

Additionally, each pair of pads is, preferably, so arranged that the corresponding open apexes of the "V"s are adjacent to each other although there is a space between, as noted above. Alternatively, the pairs could be so arranged that the mouths of the "V"s were adjacent each other.

The pivot hinge comprises, preferably, a rod-like member which is an integral part of the pad and is positioned at the bottom of the pad, and an elongate receiving receptor which is an integral part of the pad-holding end of the brush.

The rod-like member comprises a rod having a truncated circular cross-section and also having an elongate protruding web which serves to connect the rod-like member to the bottom of the pad. The truncated circular segment of the perimeter comprises somewhat more than a semi-circle. The protruding web is configured with a relatively short, but preferred, connecting dimension, as to be described in more detail below.

The receiving receptor is fashioned as a groove in the pad-holding end of the brush, and likewise has a truncated circular cross section which comprises somewhat more than a semi-circle. The radius of the circular segment of the receiving receptor is slightly greater than the radius of the circular segment of the rod-like member, being so sized that when the rod-like member is engaged with the receiving receptor it fits snugly, but not tightly, therein, thus allowing it to pivot freely, but not loosely. Thus, as the rod-like member pivots back and forth, the bristle-holding pad rocks back and forth. The importance of the connecting dimension of the protruding web on the rod-like member now becomes apparent. This dimension must be such as to permit the base of the pad to be spaced above the pad-holding end of the brush so as to allow the pad to rock a preferred amount before it strikes the pad-holding end. At the same time this dimension must not be too great or the pad would rock too far. Preferably the configuration will be such that the pad can rock back and forth through an angle of approximately ±45°, that is 22.5° in each direction. This angle is not critical, although it should preferably be within the range of 10° to 90°.

The reason for the spacing between adjacent pads also now becomes apparent. The spacing is preferably such that as adjacent pads rock oppositely so as to bring the bristles towards each other the bristles impact each other but do not significantly intermesh. Furthermore, the pads rock without mutual interference.

The invention also comprises an alternate embodiment of the pivotal engagement means. In this alternate embodiment a pair of knobs are employed rather than a rod-like member, and a pair of knob-receiving receptors are employed rather than an elongate receiving receptor. The pair of knobs protrude from opposite ends of the pad and are positioned along the pivotal axis of the pad. The knob-receiving receptors are emplaced and configured so as to snugly, but not tightly, engage and secure therein the pair of knobs when emplaced therein.

The use of the toothbrush will now be explained. As noted before, each pad has its pivotal axis arranged to be at an acute angle with respect to the elongate longitudinal axis of the pad. As the brush is stroked side-to-side along the teeth of a user the pads move back and forth in a longitudinal direction. At the same time, as can be shown by a kinematic analysis, the pair of pads which has the apex of its "V" shape facing the direction of motion will rock transverse to the direction of motion, outwardly and oppositely to each other, thus spacing their bristles farther apart. Conversely, the pair of pads which has the mouth of its "V" shape facing the direction of motion will rock transverse to the direction of motion, inwardly and oppositely to each other, thus bringing their bristles closer together. Thus as the brush is stroked side-to-side along the sides of a user's teeth each pair of bristles rocks first one way and then the other, providing an up-and-down motion. A kinematic analysis shows that the tip of any given bristle follows an elliptical trajectory as the brush is stroked side-to-side, thus resulting in a swirling motion. Thus, an enlarged area is brushed by the bristles over that provided by an ordinary brush. Furthermore, this effects an action whereby the bristles penetrate slightly into the space between the teeth and gum of a user. This has been found to be very beneficial in mitigating against periodontal disease.

The pads, webs and body of the toothbrush are preferably molded from a plastic which is sufficiently strong, but yet somewhat elastic, such that the rod-like members can be snapped into position in the receptors, at least when still warm after being removed from the molds.

As a further refinement, drain holes are preferably provided through the body of the brush which communicate at one end with the pivotal engagement means or web hinges and at the other end with open space. Thus the pivot or brush can be washed and kept free of debris.

A still further embodiment of the invention employs means whereby the pads incorporate slide members which engage sideways, thus providing a sliding up-down motion of the bristles rather than a rocking up-down motion.

In this embodiment a pair of transverse elongate rod-like members are incorporated respectively at opposite ends of each pad. These slide members protrude from the pad and are positioned such that their axes form an acute angle with the elongate axis of the pad, the angle being somewhat less than 90°. These slide members comprise rods having a truncated circular cross-section, and also having an elongate protruding web which serves to connect the rod to the bottom of the pad. The truncated circular segment of the perimeter comprises somewhat more than a semi-circle. The protruding web is configured with a relatively short connecting dimension servicing to connect the slide member to the pad and to space it slightly therefrom.

The receiving receptor is fashioned as a groove in the pad-holding end of the brush, and likewise has a truncated circular cross section which comprises somewhat more than a semi-circle. The radius of the circular segment of the receiving receptor is slightly greater than the radius of the circular segment of the slide member, being so sized that when the slide member is engaged with the receiving receptor it fits snugly, but not tightly, therein, thus allowing it to slide freely, but not loosely. Thus, as the slide member slides back and forth, the bristle-holding pad slides back and forth.

As with the previous embodiments there are preferably two pairs of pads per toothbrush. These pads, in the illustrated embodiment, are configured and emplaced such that the slideway axes of a pair of pads form a substantially "V" configuration, with a slight space between them such that the apex of the "V" is open. The two pairs of pads are so emplaced that one pair is end-to-end adjacent to the other pair, and such that either the apexes of the "V"s, or, alternatively, the mouths of the "V"s are adjacent each other. Applying the same kinematic analysis as before it can be shown that a side-to-side brushing of the teeth, i.e., back-and-forth motion of the brush along is longitudinal axis, will effect an up-down motion of the pads, wherein one pair of pads slides towards each other as the other pair slides away from each other, which motion reverses as the motion of the brush is reversed.

It should be noted that for purposes of this specification both the pivotal axis and the slideway axis, as discussed above, are alternatively termed the transverse motion axis, being the axis along which, or about which, a transverse motion of a pad takes place as the brush is stroked along the elongate axis of the pad.

BRIEF DESCRIPTION OF THE DRAWINGS

In order to more fully understand the manner in which the above-recited advances and objects of the invention are obtained, a more particular description of the invention will be rendered by reference to specific embodiments thereof which are illustrated in the appended drawings. Understanding that these drawings depict only one or more typical embodiments of the invention and are therefore not to be considered limiting of its scope, the presently preferred embodiments and the presently understood best mode of the invention will be described with additional detail through use of the accompanying drawings in which.

DETAILED DESCRIPTION OF THE PREFERRED EMBODIMENTS

Reference is now made to the drawings wherein like parts are designated with like numerals throughout.

Figure 1:
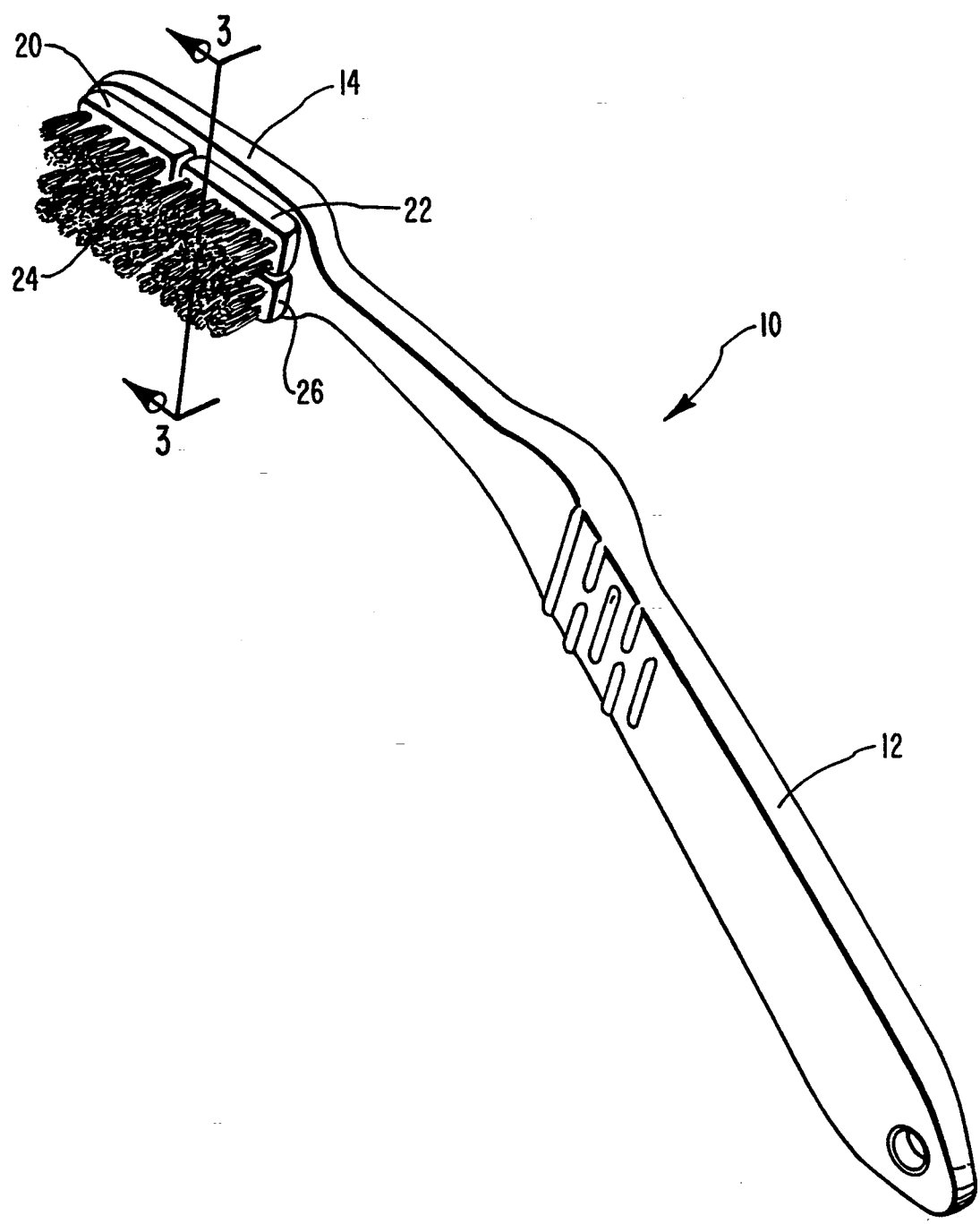
FIG. 1 is a perspective view of one embodiment of the toothbrush having two pairs of bristle-carrying pads with two rows of bristles on each pad.
Figure 2:
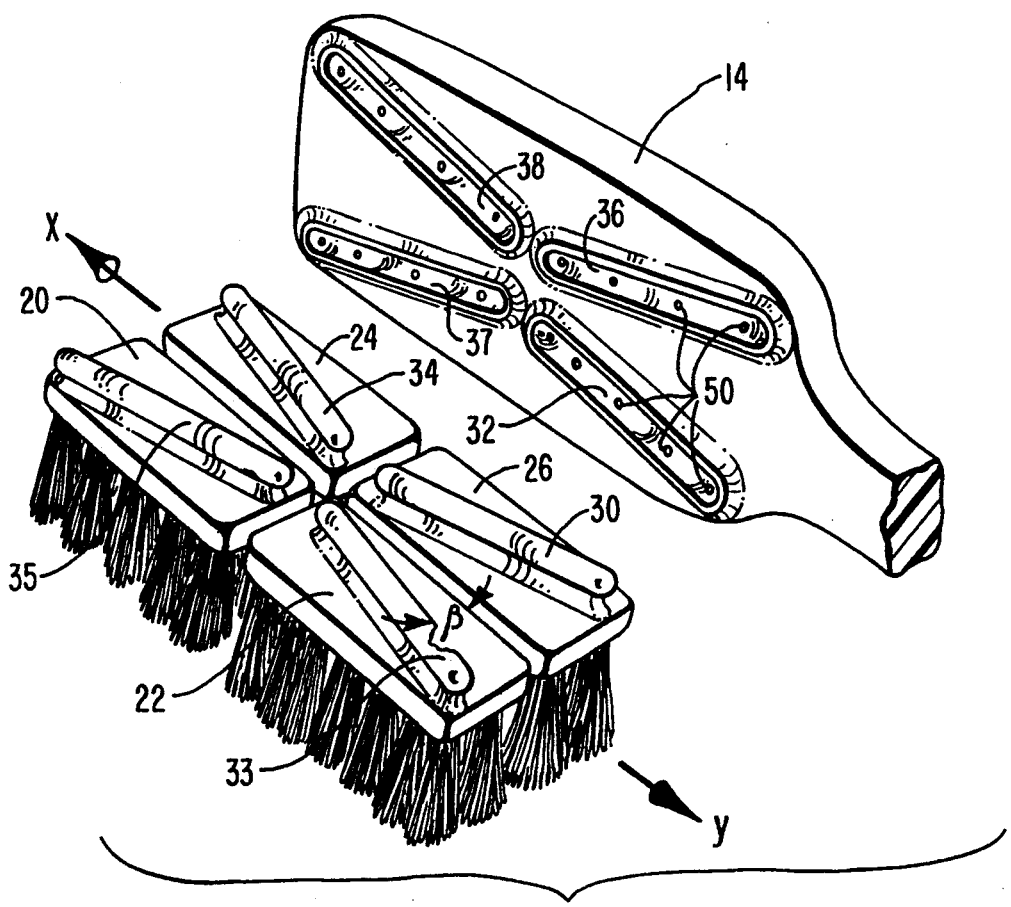
FIG. 2 is a perspective view showing the pad-holding end of the toothbrush with the pads removed, and also showing the four pads after removal but positioned in their normal position with respect to each other.

Referring first to FIG. 1, the toothbrush 10 is shown having a conventional elongate handle 12 and a bristle pad-holding end 14 configured in conformity with the present invention. As shown in FIGS. 1 and 2, there are preferably four bristle-holding pads, 20, 22, 24, and 26, which engage the pad-holding end 14. Likewise, as shown, there are preferably two rows of bristles per pad although there may be more or less.

As shown best in FIG. 2, each pad is devised so as to be pivotally attached to the pad-holding end 14. The pivotal attachment for each pad comprises a hinge which in turn comprises a rod-like member, such as 30, affixed to pad 26, and a receiving receptor 32 affixed to pad-holding end 14. Similarly, for rod-like members 33, 34, 35 there are receiving receptors 36, 37, 38.

Figure 3:
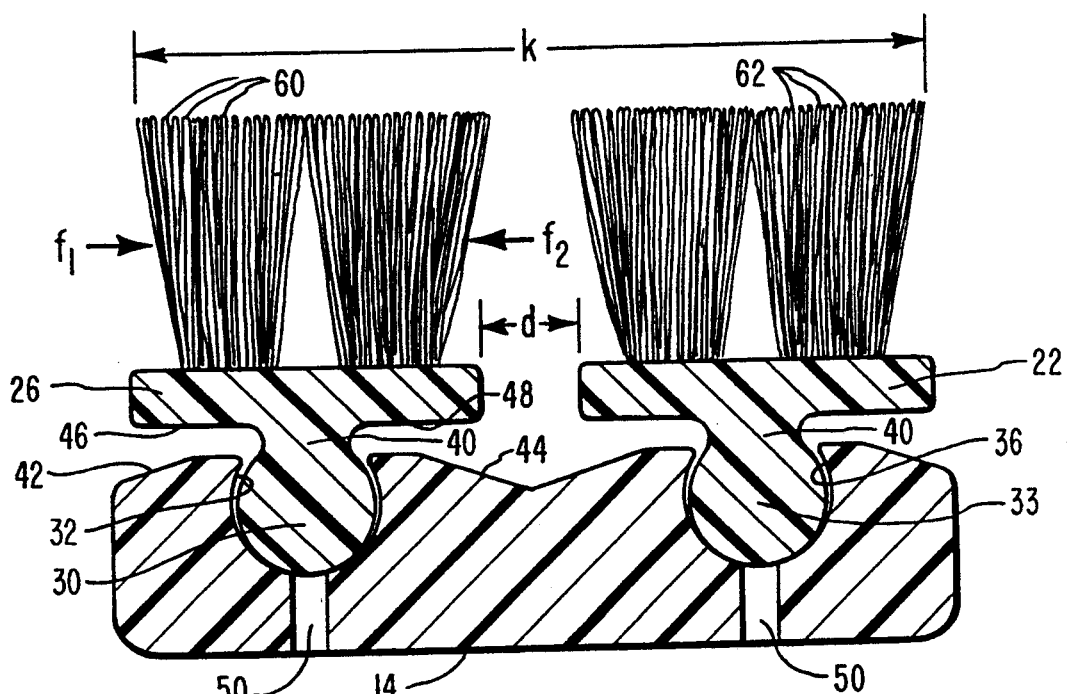
FIG. 3 is a cross sectional view taken along line 3—3 of FIG. 1, to an enlarged scale.

Preferably, rod-like member 30 is fashioned as an integral part of pad 26, as shown best in FIG. 3. Likewise, receiving receptor 32 is fashioned as an integral part of pad-holding end 14.

Rod-like member 30 is configured so as to be substantially circular, but truncated, in cross-section having an elongate protruding web 40 extending from a small segment of the perimeter of member 30, such that the circular segment of member 30 comprises somewhat more than a semi-circle.

Receiving receptor 32 is an elongate groove configured so as to be substantially circular in cross section, but being truncated such that the circular engagement comprises somewhat more than a semi-circle.

The radius of the circular segment of member 30 is slightly less than the radius of the circular segment of receptor 32. The radii are chosen such that member 30 engages receptor 32 snugly, but not tightly. Thus member 30 can pivot freely in receptor 32 when a pivotal force is applied to pad-holding end 26, normally by way of the bristles. However, the engagement is snug enough that member 30 does not pivot by itself merely due to gravitational forces.

Rod-like member 30 is assembled to pad-holding end 14 by being snapped into place. In order to make this possible member 30 and pad-holding end 14 are fashioned, preferably, from a molded plastic material which has sufficient strength to make the toothbrush substantially rigid, but at the same time has sufficient elasticity that member 30 can be snapped into receptor 32 even though the opening in member 32 is less than the diameter of member 30. It has been found that this snap-fitting can be most easily effected when the parts are still warm as they come from the mold. Once engaged the assembly is substantially permanent. A satisfactory material is polycarbonate.

With this assembly, then, as pivotal forces, depicted schematically as $f_1$ and $f_2$ in FIG. 3, are alternately applied to the bristles, as explained in more detail below, pad 26 rocks back-and-forth. The angle $\alpha$ (see FIG. 4) through which the pad can rock is determined by the dimensions of protruding web 40 and the contour of pad-holding end 14. As shown, pad-holding end 14 has inclined surfaces 42 and 44 against which surfaces 46 and 48 of pad 26 abut when pad 26 is rocked to its limits. This is shown best in FIGS. 4 and 5. Preferably, the configuration is such that pad 26 can rock through the angle a of approximately ±45°, i.e. 22.5° in each direction, although this angle is not critical. However, it should preferably be within the range of 10° to 90°.

Figure 4:
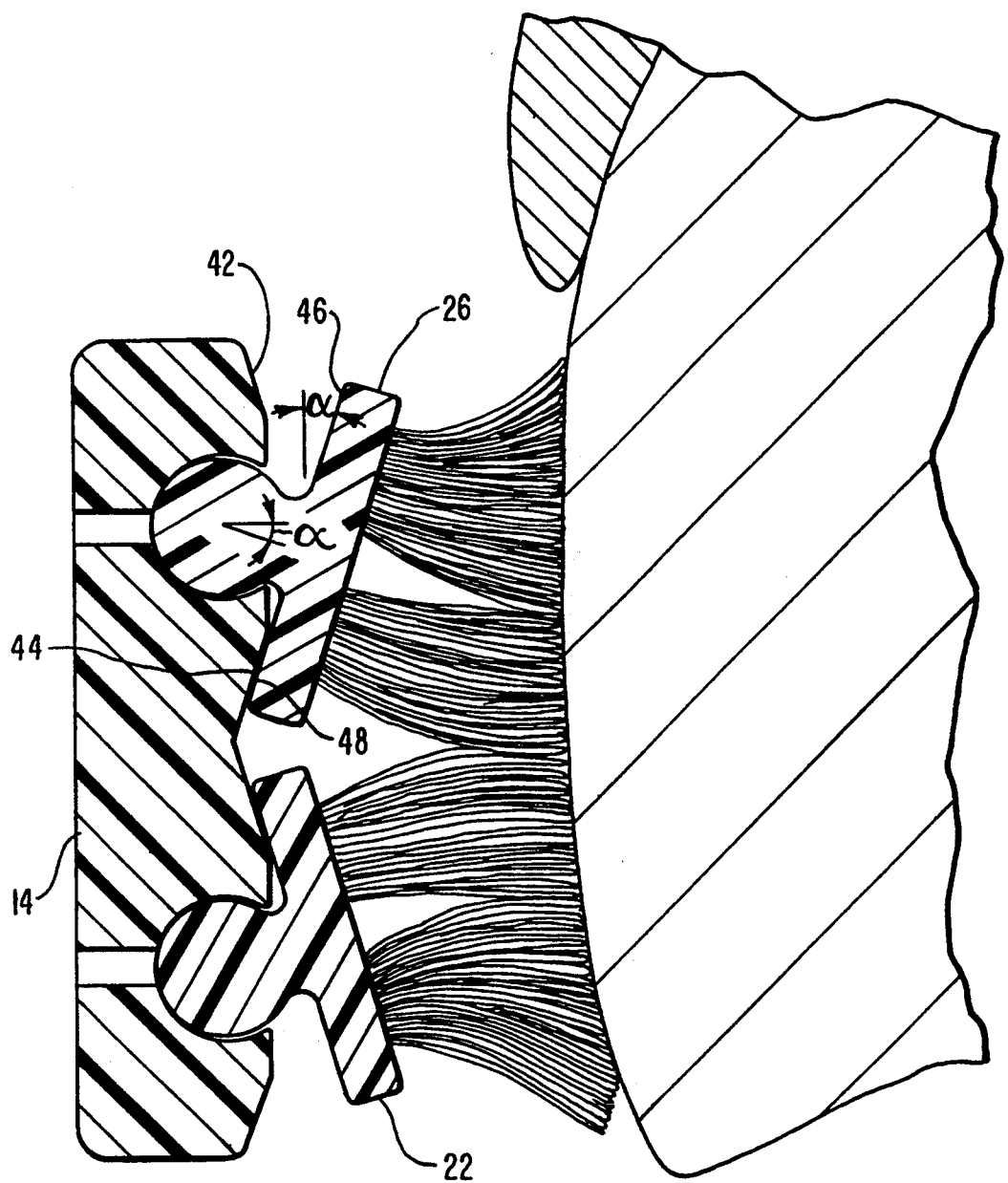
FIG. 4 is a cross sectional view corresponding to FIG. 3 except with the pads shown rocked towards each other.

The spacing "d," see FIG. 3, between adjacent pads 26 and 22 is such that when the pads are rocked towards each other the tips of the bristles impact each other but do not substantially intermesh, as shown in FIG. 4. The spacing is also such that pads 26 and 22 do not interfere with each other when rocked through their respective maximum angles, as depicted in FIG. 4.

A significant advantage of the toothbrush of this invention is the greater area of a tooth that is covered as the brush is stroked from side-to-side by a user. As depicted in FIG. 3 the up-down dimension that is covered by a brush that did not rock is depicted as "k." In FIG. 5 this dimension for a brush that does rock is depicted as "m." As can be seen, "M" is significantly greater than "k."

Figure 5:
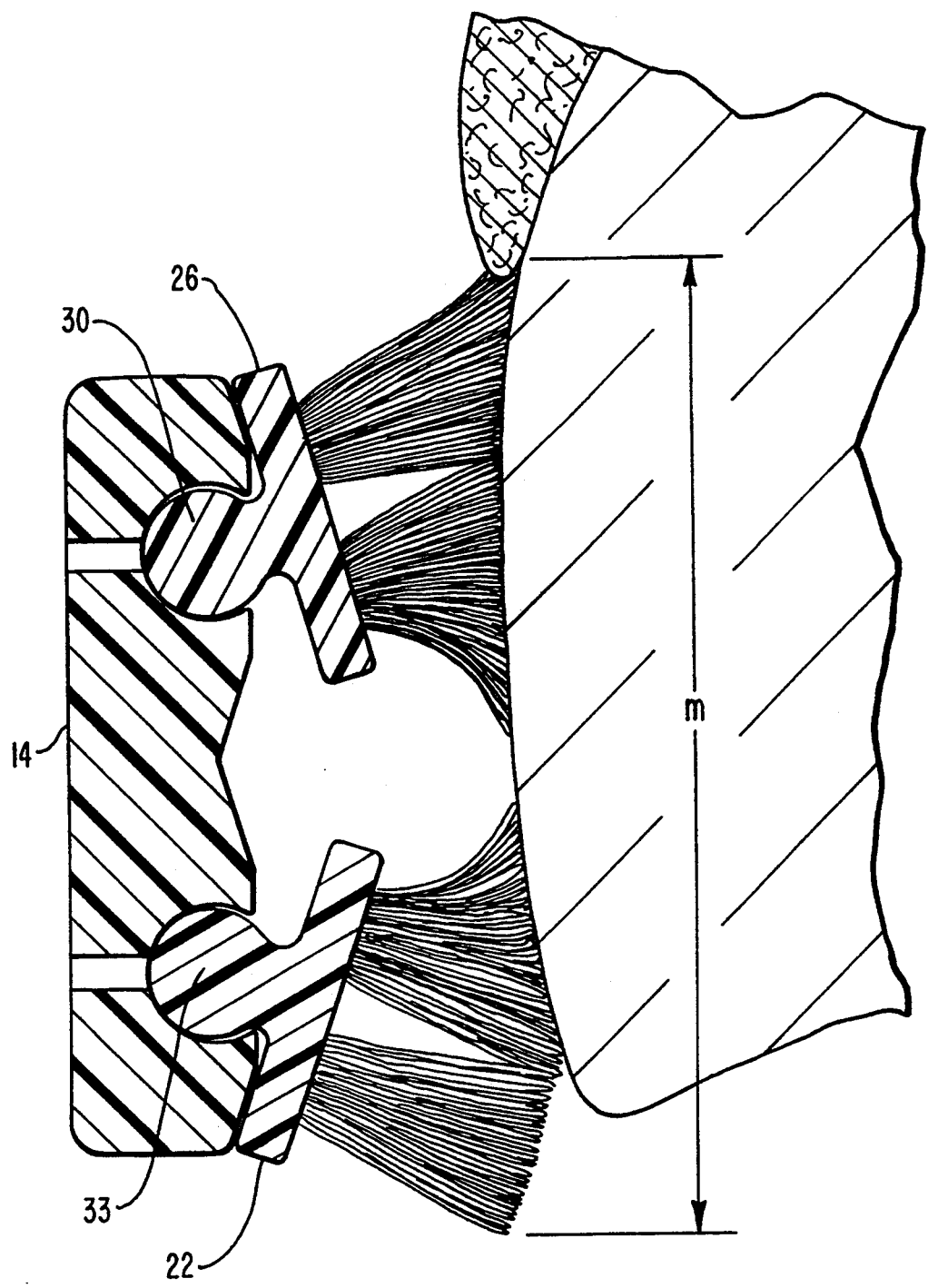
FIG. 5 is a cross sectional view corresponding to FIG. 3 except with the pads shown rocked away from each other.

Another significant advantage accruing from the use of the invention is the cleaning that occurs between the tooth and the gum line, as depicted in FIG. 5. As the pads rock outwardly, some of the bristles protrude slightly into the space between the tooth and the gum, as shown. This cleaning action significantly reduces the onslaught of periodontal disease.

Another feature of the invention is the incorporation of drain holes, such as 50 shown in FIGS. 2 and 3. A plurality of drain holes communicate at one end with the hinge and at the other end with open space, all as shown. These facilitate the cleaning of the brush, especially the hinge, by allowing water to circulate therethrough.

The rocking action is now explained in more detail. As shown in FIG. 2 the rod-like member, such as 30, of each pad, such as 26, is so positioned that it forms an acute angle "B" with respect to the elongate axis of the pad. Likewise, of course, the receptor 32 forms a similar angle with respect to the elongate axis of the pad-holding end 14 of the brush. Adjacent pads 22 and 26 are positioned such that rod-like members 30 and 33 form substantially a "V" shape with the apex of the "V" in the center of the brush and the mouth of the "V" at the end. Likewise, pads 20 and 24 are similarly positioned, with the apex of the "V" formed by members 34 and 35 adjacent to the apex of the "V" formed by members 30 and 33. Although this is preferred configuration the pads can be so positioned that the mouths of the "V"s are adjacent rather than the apexes of the "V"s.

Now, as the brush is stroked along the sides of a user's teeth in a direction as indicated by "x," FIG. 2, pads 20 and 24 will rock outwardly, oppositely from each other, so as to spread their corresponding bristles further apart. At the same time pads 22 and 26 will rock inwardly so as to cause their corresponding bristles to come together. When the brush is stroked in the other direction, as indicated by "y," the pads will rock oppositely. This back-and-forth stroking of the brush will effect repetitive rocking motions of the pads. This produces a swirling motion of the bristles on the teeth wherein any given bristle follows an elliptical trajectory on the teeth. As a consequence, each tooth is brushed in all directions. Stated another way, an up-down brushing is effected simultaneously with a side-to-side brushing.

Figure 6:
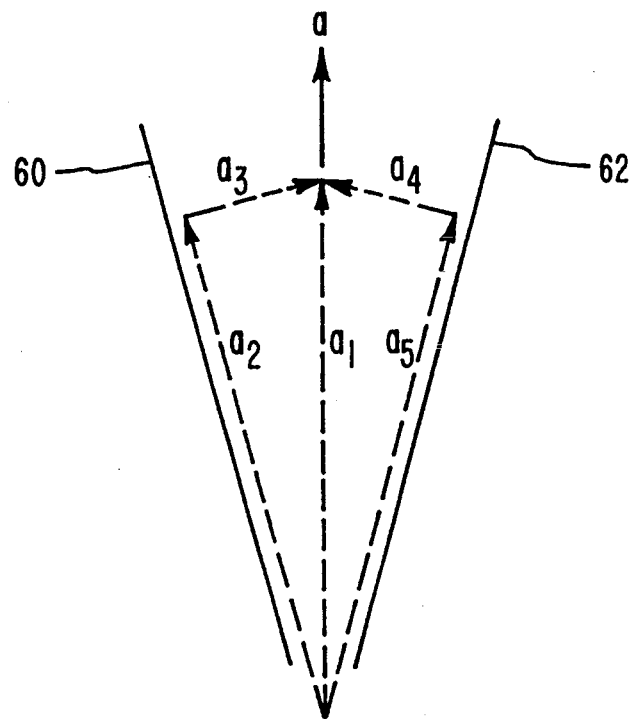
FIG. 6 is a schematic representation of the forces acting on the pads so as to cause them to rock towards each other.
Figure 7:
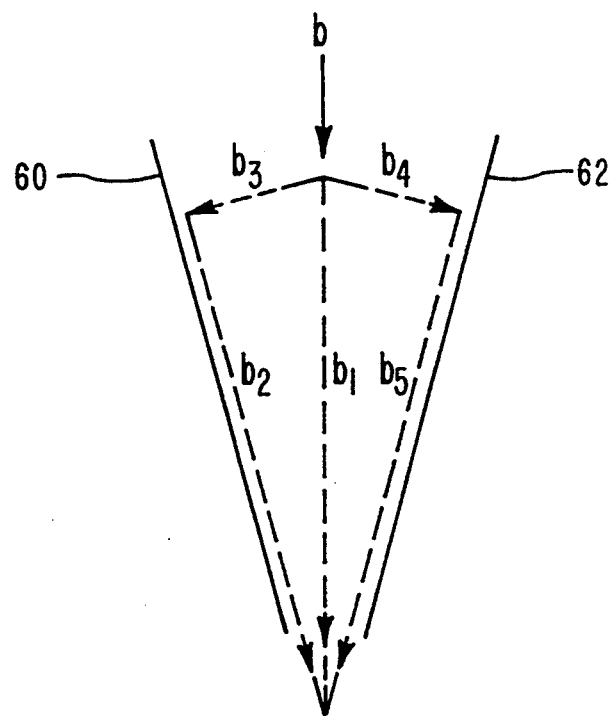
FIG. 7 is similar to FIG. 6 except that the forces cause the pads to rock away from each other.

The forces which create these rocking motions are evident from a simple kinematic analysis as shown in FIGS. 6 and 7. Referring to FIG. 6, 60 and 62 represent, in schematic form, the tips of bristles in pads 22 and 26. "a" represents the direction of a force transmitted to these bristle tips with $a_1$ being its magnitude. For bristle tips 60, $a_1$ is composed of forces $a_2$, directed along the elongate axis of the bristles, and $a_3$, orthogonal thereto. The force $a_3$ acts at the end of a crank arm of the pivot comprised of rod-like member 30 and receptor 32. The crank arm is comprised of a combination of the bristles, the pad 26, and the protruding web 40. As can be seen, this force then rotates the tips of the bristles, and thus the pad inwardly. Similarly, for bristle tips 62, $a_1$ is composed of forces as, directed along the elongate axis of the bristles, and at$_a$, orthogonal thereto. Thus, in a similar manner $a_4$ rotates the tips of the bristles, and thus the pad, inwardly.

The forces of FIG. 7 can be analyzed in similar fashion. Since force "b" is directed oppositely to force "a" of FIG. 6, the bristles rotate oppositely, as depicted by force arrows $b_3$ and $b_4$, which thus rock the pads outwardly.

Figure 8:
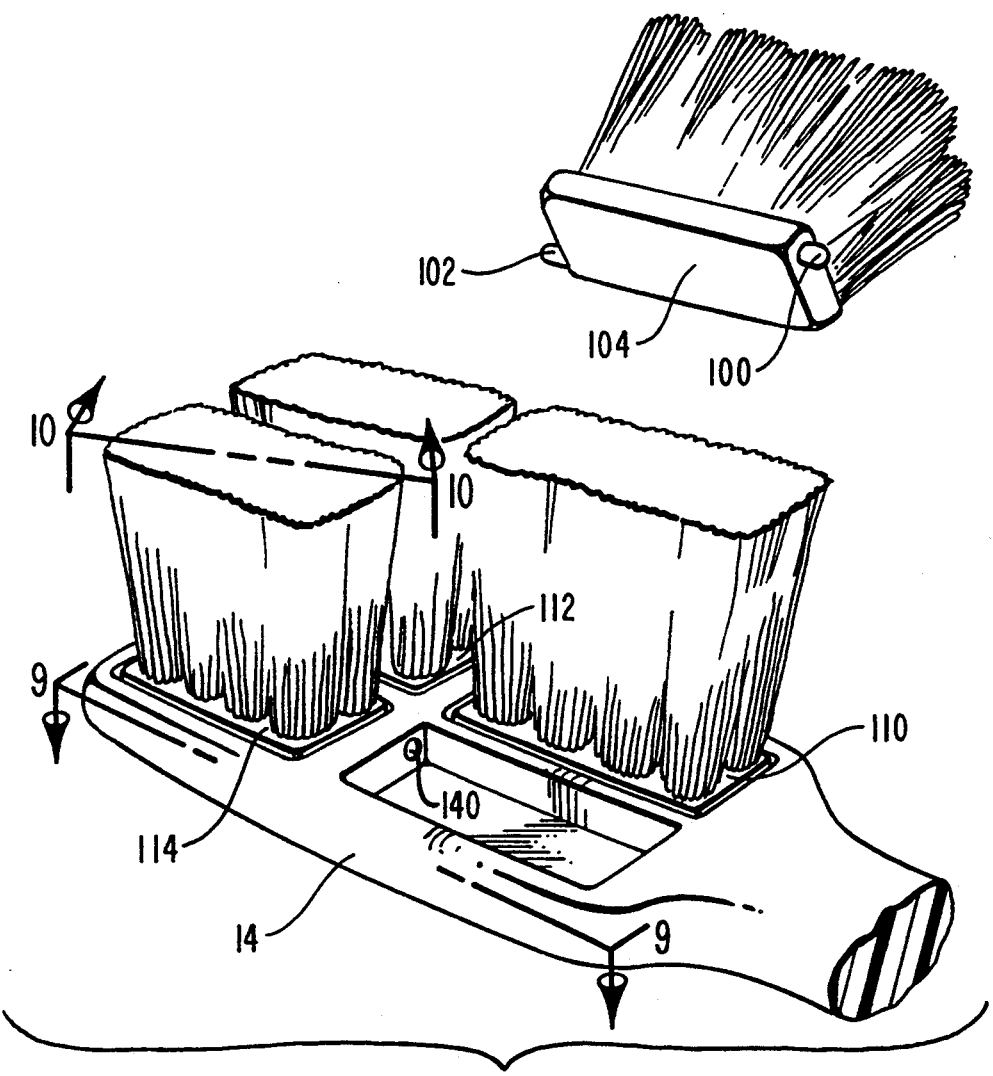
FIG. 8 is a perspective view of another embodiment of the invention with one pad shown removed.
Figure 9:
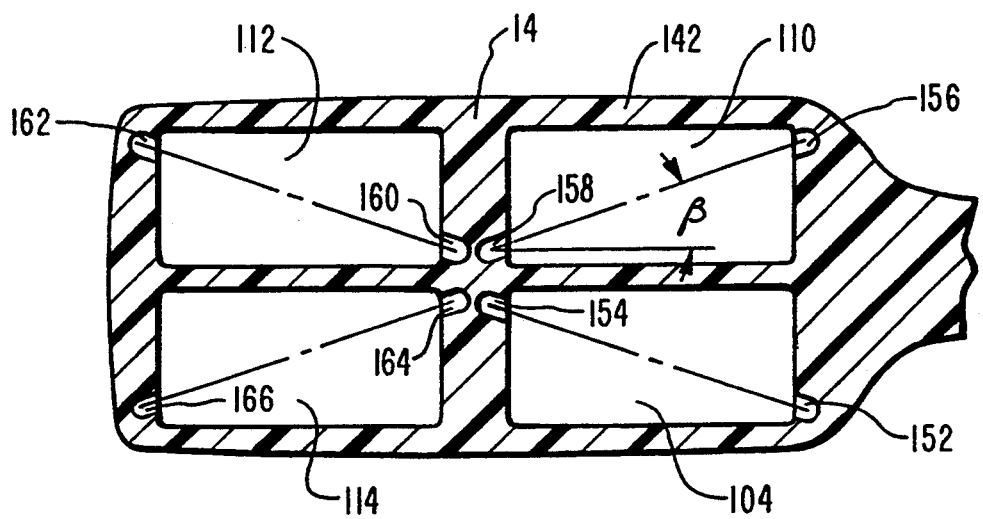
FIG. 9 is a cross sectional view taken along the line 9—9 of FIG. 8, with the pads removed, to an enlarged scale.

An alternative embodiment of the invention is shown in FIGS. 8 and 9. In this embodiment the hinge means comprises a pair of knobs 100 and 102 integral with respective opposite ends of a pad 104. Knobs 100 and 102 protrude outwardly from pad 104 and are positioned so as to lie along a pivotal axis, $\beta$, as shown in FIG. 9, wherein the pivotal axis forms an angle $\beta$ with respect to the longitudinal axis of the pad within the range of 10° to 90°, preferably being about 45°.

Figure 10:
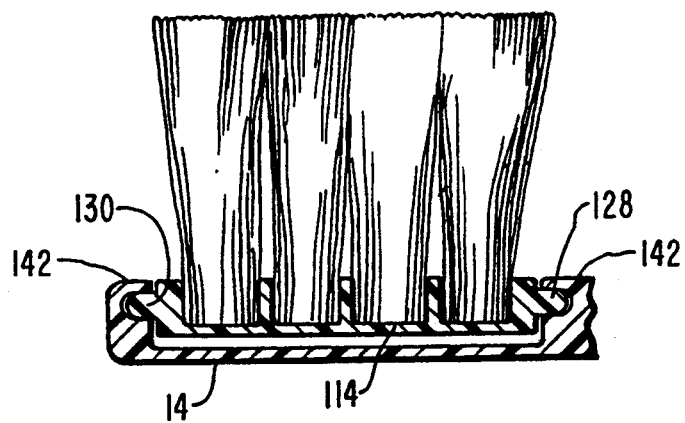
FIG. 10 is a cross sectional view taken along the line 10—10 of FIG. 8.

Pads 110, 112 and 114 have similar respective knobs, not shown, Each knob, such as 128 and 130 shown in FIG. 10, is preferably configured as a short round post having a rounded semi-spherical end as shown. The pad-holding end 14 of the brush has a turned-up lip 142 fashioned around its perimeter, and also extending across the central region of pad-holding end 14, being orthogonal to the elongate axis of pad-holding end 14. Turned-up lip 142 has receptors such as 152, 154, 156, 158, 160, 162, 164, 166, fashioned therein, each of which, such as 152, is configured and emplaced so as to receive and secure a corresponding knob, such as 100, snugly but not nightly. Each receptor has a semi-spherical shape, having a radius slightly greater than the radius of a knob.

Pads 104 and 110 are configured and emplaced such that their pivotal axes form a "V" shape, having an open apex which is adjacent to pads 112 and 114. Pads 112 and 114 are configured and emplaced such that their pivotal axes form a "V" shape with the apexes of the "V" being adjacent to the axis of the "V" of pads 104 and 110.

By applying the same kinematic analysis as before it can be seen that as the brush is stroked back and forth along its longitudinal axis, across the teeth of a user, apex 104 and 110 rock first towards each other and then away from each other along their pivotal axis. At the same time pads 112 and 114 rock first away from each other and then towards each other along their pivotal axis.

Figure 11:
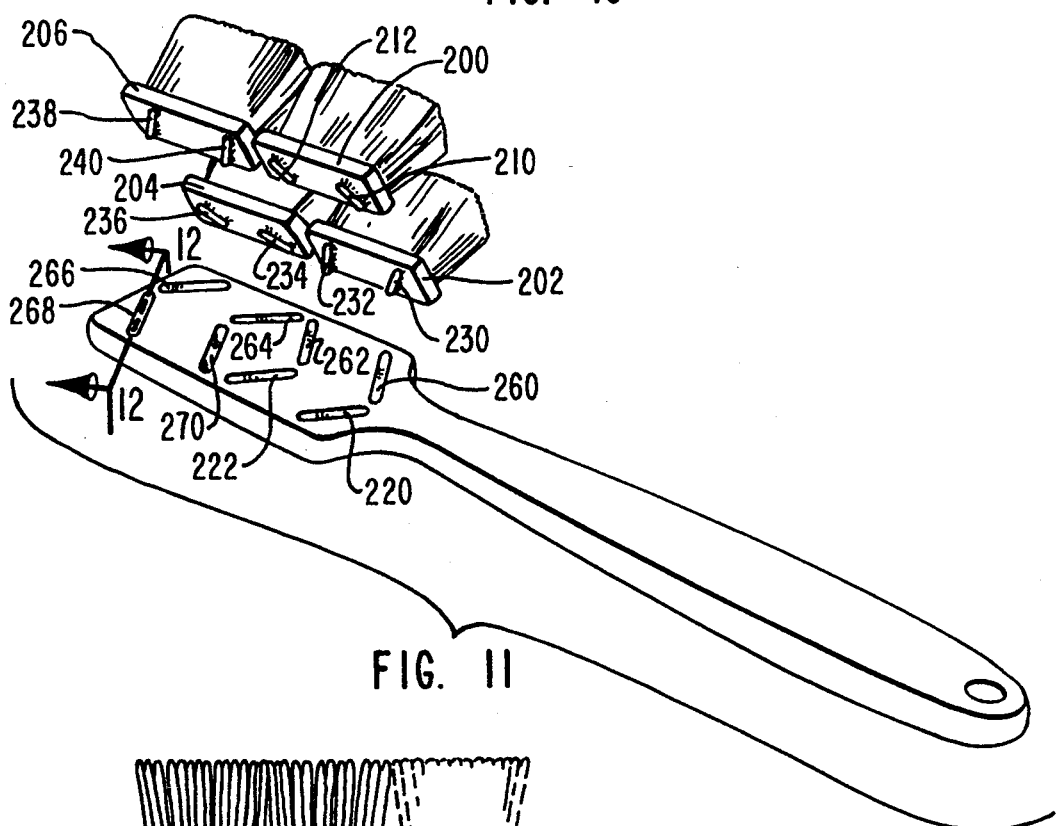
FIG. 11 is an exploded perspective view of still another embodiment of the invention.

A still further embodiment of the invention is shown in FIG. 11. This embodiment relies on a sliding action of the pads rather than a rocking action. As before, four pads 200, 202, 204 and 206 are emplaced, pads 200 and 202 being emplaced as an adjacent side-by-side pair, and 204 and 206 emplaced as an adjacent side-by-side pair, also being emplaced in an end-to-end fashion adjacent to pads 200 and 202.

Each pad, such as 200, has a pair of elongate slide members, such as 210 and 212, integral with the bottom of the pad, as shown in FIG. 11. These slide members are emplaced near respective opposite ends of the pad, are parallel to each other, and have their axis forming an angle $\beta$ within the range of 10° to 90°, preferably about 45°, with respect to the longitudinal axis of the pad.

Pad-holding end 14 has slideways, such as 220 and 222, fashioned therein, configured and emplaced so as to receive, and secure, corresponding slide members 210 and 212. Slideways 220 and 222 are somewhat longer than slide members 210 and 212 so as to allow a controlled amount of sliding motion, as shown best in FIG. 12.

Figure 12:
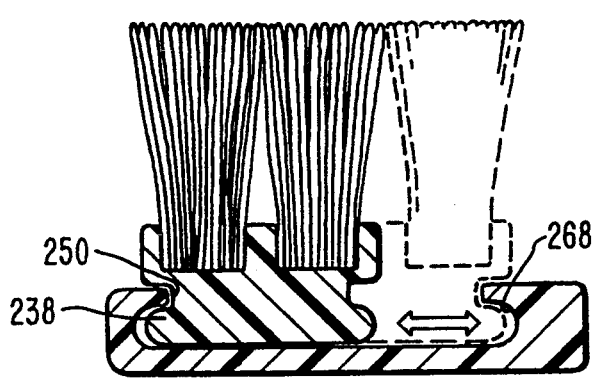
FIG. 12 is a cross sectional view taken along the line 12—12 of FIG. 11.

Slide members 210, 212, 230, 232, 234, 236, 238, and 240 are fashioned as rods having a truncated circular cross section comprising somewhat more than a semi-circle, and being connected to the bottom of respective pads 200, 202, 204, and 206 by respective webs such as 250 shown in FIG. 12.

Slideways 220, 222, 260, 262, 264, 266, 268 and 270 are fashioned as groves also having a truncated circular cross section comprising somewhat more than a semi-circle, and having a radius slightly greater than the radius of the slide members.

By applying the same kinematic analysis as for the other embodiments it can be seen that as the brush is stroked along its longitudinal axis pads 200 and 206 slide towards each other, and vice versa as the brush is stroked backwards.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. A toothbrush comprising:
   (a) an elongated handle having a proximal and a distal end and defining therebetween a longitudinal axis of said handle;
   (b) a first bristle support having opposed top and bottom surfaces;
   (c) bristles projecting from said top surface of said first bristle support;
   (d) a first bristle support attachment means for tiltingly securing said first bristle support to said distal end of said handle with said bristles on said first bristle support projecting away from said handle for tilting movement only in either of two opposite directions about a first tilting axis, said first tilting axis being aligned with said first bristle support attachment means;
   (e) a second bristle support having opposed top and bottom surfaces;
   (f) bristles projecting from said top surface of said second bristle support; and
   (g) a second bristle support attachment means for tiltingly securing said second bristle support to said distal end of said handle proximate said first bristle support with said bristles on said second bristle support projecting away from said handle for tilting movement only in either of two opposite directions about a second tilting axis, said second tilting axis being aligned with said second bristle support attachment means, and said second tilting axis being disposed at an oblique angle to said first tilting axis.

2. A toothbrush as recited in claim 1, wherein said first tilting axis is disposed at an acute angle to said longitudinal axis of said handle.

3. A toothbrush as recited in claim 1, wherein said second bristle support is positioned on said distal end of said handle laterally adjacent to said first bristle support.

4. A toothbrush as recited in claim 1, wherein said second bristle support is secured to said distal end of said handle in longitudinal alignment with said first bristle support.

5. A toothbrush as recited in claim 1, wherein:
   (a) said first bristle support attachment means comprises:
      (i) a first elongated attachment rod secured to said bottom surface of said first bristle support in a spaced apart relationship thereto; and
      (ii) a first elongated attachment rod receiving slot formed in said distal end of said handle and having a longitudinal axis coinciding with said first tilting axis, said receiving slot being so sized as to receive and tiltably retain said first attachment rod for tilting movement of said first attachment rod and said first bristle support; and
   (b) said second bristle support attachment means comprises:
      (i) a second elongated attachment rod secured to said bottom surface of said second bristle support in spaced apart relationship thereto; and
      (ii) a second elongated attachment rod receiving slot formed in said distal end of said handle and having a longitudinal axis coinciding with said second tilting axis, said second receiving slot being so sized as to receive and tiltably retain said second attachment rod for tilting movement of said second attachment rod and said second bristle support.

6. A toothbrush as recited in claim 1, wherein
   (a) said first bristle support attachment means comprises:
      (i) a first pair of attachment knobs projecting from opposite ends of said first bristle support; and
      (ii) a first pair of opposed attachment knob receiving sockets formed in said distal end of said handle in alignment with said first tilting axis, said first pair of receiving sockets being so sized and positioned as to each receive and retain a corresponding one of said first pair of attachment knobs for tilting movement of said first pair of attachment knobs and said first bristle support; and
   (b) said second bristle support attachment means comprises:
      (i) a second pair of attachment knobs projecting from opposite ends of said second bristle support; and
      (ii) a second pair of opposed attachment knob receiving sockets formed in said distal end of said handle in alignment with said second tilting axis, said second pair of receiving sockets being so sized and positioned as to each receive and retain a corresponding one of said second pair of attachment knobs for tilting movement of said second pair of attachment knobs and said second bristle support.

7. A toothbrush comprising:
   (a) an elongated handle having a proximal and a distal end and defining therebetween a longitudinal axis of said handle;
   (b) a first bristle support having opposed top and bottom surfaces;
   (c) bristles projecting from said top surface of said first bristle support;
   (d) a first bristle support attachment means for tiltingly securing said first bristle support to said distal end of said handle with said bristles on said first bristle support projecting away from said handle for tilting movement only in either of two opposed directions about a first axis disposed at an acute angle to said longitudinal axis of said handle, said first axis defining a first tilting axis aligned with said first bristle support attachment means;
   (e) a second bristle support having opposed top and bottom surfaces;
   (f) bristles projecting from said top surface of said second bristle support;
   (g) second bristle support attachment means for tiltingly securing said second bristle support to said distal end of said handle with said bristles on said second bristle support projecting away from said handle for tilting movement only in either of two opposite directions about a second axis disposed at an acute angle to said longitudinal axis of said handle, said second axis defining a second tilting axis aligned with said second bristle support attachment means, and wherein said first tilting axis is disposed at an acute angle to said second tilting axis.

8. A toothbrush as recited in claim 7, wherein:
   (a) said first bristle support attachment means comprises:

(i) a first elongated attachment rod secured to said bottom surface of said first bristle support in a spaced apart relationship thereto; and (ii) a first elongated attachment rod receiving slot formed in said distal end of said handle and having a longitudinal axis coinciding with said first tilting axis, said first receiving slot being so sized as to receive and tiltably retain first said attachment rod for tilting movement of said first attachment rod and said first bristle support; and (b) said second bristle support attachment means comprises:

(i) a second elongated attachment rod secured to said bottom surface of said second bristle support in spaced apart relationship thereto; and (ii) a second elongated attachment rod receiving slot formed in said distal end of said handle and having a longitudinal axis coinciding with said second tilting axis, said second receiving slot being so sized as to receive and tiltably retain said second attachment rod for tilting movement of said second attachment rod and said second bristle support.

9. A toothbrush as recited in claim 7, wherein (a) said first bristle support attachment means comprises:

(i) a first pair of attachment knobs projecting from opposite ends of said first bristle support; and (ii) a first pair of opposed attachment knob receiving sockets formed in said distal end of said handle in alignment with said first tilting axis, said first pair of receiving sockets being so sized and positioned as to each receive and tiltably retain a corresponding one of said first pair of attachment knobs for tilting movement of said first pair of attachment knobs and said first bristle support; and (b) said second bristle support means comprises:

(i) a second pair of attachment knobs projecting from opposite ends of said second bristle support; and (ii) a second pair of opposed attachment knob receiving sockets formed in said distal end of said handle in alignment with said second tilting axis, said second pair of receiving sockets being so sized and positioned as to each receive and retain a corresponding one of said second pair of attachment knobs for tilting movement of said second pair of attachment knobs and said second bristle support.

10. A toothbrush comprising:

(a) an elongated handle having a proximal and a distal end and defining therebetween a longitudinal axis of said handle;

(b) a bristle support having opposed top and bottom surfaces;

(c) bristles projecting from said top surface of said bristle support; and (d) bristle support securement means for slidably attaching said bristle support to said distal end of said handle with said bristles projecting away from said handle for sliding movement in either of two opposite directions along an axis disposed at an acute angle to said longitudinal axis of said handle, said axis defining a sliding axis of said bristle support securement means.

11. A toothbrush as recited in claim 10, wherein said bristle support securement means comprises:

(a) an elongated attachment rod secured to said bottom surface of said bristle support in a spaced apart relationship thereto; and (b) an elongated attachment rod receiving slot formed in said distal end of said handle and having a longitudinal axis coinciding with said sliding axis of said bristle support securement means, said receiving slot being so sized as to receive and retain said attachment rod for sliding movement of said attachment rod along said longitudinal axis of said receiving slot.

12. A toothbrush as recited in claim 11, wherein said attachment rod is integrally formed with said bottom surface of said bristle support.

13. A toothbrush as recited in claim 11, wherein said attachment rod and said receiving slot are so sized and configured as to permit said attachment rod to be snappingly received into said receiving slot.

14. A toothbrush comprising:

(a) an elongated handle having a proximal and a distal end and defining therebetween a longitudinal axis of said handle;

(b) a bristle support having opposed top and bottom surfaces;

(c) bristles projecting from said top surface of said bristle support;

(d) an elongated attachment rod secured to said bottom surface of said bristle support in a spaced apart relationship thereto; and (e) an elongated attachment rod receiving slot formed in said distal end of said handle and having a longitudinal axis disposed at an acute angle to said longitudinal axis of said handle, said receiving socket being so sized as to receive and retain said attachment rod for tilting movement of said attachment rod and said bristle support only in either of two opposite directions about said longitudinal axis of said receiving slot.

15. A toothbrush as recited in claim 14, wherein said attachment rod has a cross section which is substantially circular.

16. A toothbrush as recited in claim 14, wherein said attachment rod and said bottom surface of said bristle support are of a one-piece construction.

17. A toothbrush as recited in claim 14, wherein said attachment rod and said receiving slot are so sized and configured as to permit said attachment rod to be snappingly received into said receiving slot.

18. A toothbrush as recited in claim 14, wherein said acute angle is greater than or equal to 10°.

19. A toothbrush as recited in claim 14, wherein said tilting movement of said attachment rod and said bristle support is less than or equal to 20° in either of said two opposite directions about said longitudinal axis of said receiving slot.

20. A toothbrush as recited in claim 14, wherein said bristles are disposed in plural rows on said top surface of said bristle support.

21. A toothbrush as recited in claim 14, further comprising a drain hole formed through said distal end of said handle proximate to said bristle support.

22. A toothbrush comprising:

(a) an elongated handle having a proximal and a distal end and defining therebetween a longitudinal axis of said handle;

(b) a bristle support having opposed top and bottom surfaces;

(c) bristles projecting from said top surface of said bristle support; and (d) first and second attachment knobs projecting from opposite ends of said bristle support; and (e) first and second opposed attachment knob receiving sockets formed in said distal end of said handle and defining therebetween a tilting axis disposed at an acute angle to said longitudinal axis of said handle, said first and second receiving sockets being so sized and positioned as to each receive and retain a corresponding one of said first and second attachment knobs for tilting movement of said first and second attachment knobs and said bristle support in either of two opposite directions about said tilting axis.

23. A toothbrush as recited in claim 22, wherein said first and second attachment knobs and said bristle support are of a one-piece construction.

24. A toothbrush as recited in claim 22, wherein said first and second attachment knobs are snappingly receivable, respectively, into said first and second receiving sockets.

25. A toothbrush as recited in claim 22, further comprising a bristle support receiving recess formed in said distal end of said handle, said bristle support receiving recess being so sized as to receive said bristle support, and said first and second receiving sockets being formed in walls of opposite ends of said bristle support receiving recess.

26. A toothbrush as recited in claim 22, wherein said acute angle is greater than or equal to 10°.

27. A toothbrush as recited in claim 22, wherein said tilting movement of said first and second attachment knobs and said bristle support is less than or equal to 20° in either of said two opposite directions about said tilting axis.

28. A toothbrush as recited in claim 22, wherein said bristles are disposed in plural rows on said top surface of said bristle support.

29. A toothbrush as recited in claim 22, further comprising a drain hole formed through said distal end of said handle proximate to said bristle support.

30. A toothbrush comprising:

(a) an elongated handle having a proximal and a distal end and defining therebetween a longitudinal axis of said handle;

(b) a bristle support having opposed top and bottom surfaces;

(c) bristles projecting from said top surface of said bristle support; and (d) an elongated attachment rod secured to said bottom surface of said bristle support in a spaced apart relationship thereto; and (e) an elongated attachment rod receiving slot formed in said distal end of said handle and having a longitudinal axis disposed at an acute angle to said longitudinal axis of said handle, said receiving slot being so sized as to receive and retain said attachment rod for sliding movement in either of two opposite directions along said longitudinal axis of said receiving slot.

* * * * *

UNITED STATES PATENT AND TRADEMARK OFFICE
CERTIFICATE OF CORRECTION

PATENT NO. : 5,398,366
DATED      : March 21, 1995
INVENTOR(S) : TERRY BRADLEY

It is certified that error appears in the above-indentified patent and that said Letters Patent is hereby corrected as shown below:

Column 2, line 16, "with" should be --which--
Column 2, line 18, "mean" should be --means--
Column 2, line 20, "o" should be --of--
Column 4, line 47, "is" should be --its--
Column 6, line 34, "angle a" should be --angle α--
Column 7, line 1, "angle 'B'" should be --angle "β"--
Column 7, line 43, "as" should be --$a_5$--
Column 7, line 44, "$at_a$" should be --$a_4$--
Column 8, line 5, "nightly" should be --tightly--

Signed and Sealed this

Third Day of October, 1995

*Attest:*

BRUCE LEHMAN

*Attesting Officer*   *Commissioner of Patents and Trademarks*